(12) United States Patent
Koganezawa

(10) Patent No.: US 7,903,197 B2
(45) Date of Patent: Mar. 8, 2011

(54) LIQUID CRYSTAL DISPLAY DEVICE WITH BACKLIGHT HAVING EFFICIENT HEAT RADIATING PROPERTIES

(75) Inventor: Nobuyuki Koganezawa, Chiba (JP)

(73) Assignees: Hitachi Displays, Ltd., Chiba-Ken (JP); Hitachi Display Devices, Ltd., Chiba-Ken (JP)

( * ) Notice: Subject to any disclaimer, the term of this patent is extended or adjusted under 35 U.S.C. 154(b) by 139 days.

(21) Appl. No.: 11/697,334

(22) Filed: Apr. 6, 2007

(65) Prior Publication Data

US 2007/0236626 A1 Oct. 11, 2007

(30) Foreign Application Priority Data

Apr. 10, 2006 (JP) .................................. 2006-107315

(51) Int. Cl.
G02F 1/1335 (2006.01)
G02F 1/1333 (2006.01)
F21V 7/04 (2006.01)

(52) U.S. Cl. .............................. 349/65; 349/58; 362/612

(58) Field of Classification Search .................... 349/65; 362/612, 631

See application file for complete search history.

(56) References Cited

U.S. PATENT DOCUMENTS

| 5,769,521 | A * | 6/1998 | Osawa et al. .................... 362/27 |
| 7,184,111 | B2 * | 2/2007 | Chua et al. ....................... 349/71 |
| 7,513,668 | B1 * | 4/2009 | Peng et al. ..................... 362/600 |
| 2004/0165372 | A1 * | 8/2004 | Parker .............................. 362/31 |
| 2005/0094052 | A1 * | 5/2005 | Sakurai et al. .................. 349/58 |
| 2006/0285362 | A1 * | 12/2006 | Cho et al. ....................... 362/633 |

FOREIGN PATENT DOCUMENTS

JP 64-088426 4/1989
JP 2002-162626 6/2002

* cited by examiner

*Primary Examiner* — Michael H Caley

(74) *Attorney, Agent, or Firm* — Antonelli, Terry, Stout & Kraus, LLP.

(57) ABSTRACT

The present invention provides a liquid crystal display device having a linear light source, which is easily treated, in consideration of the heat radiation of a light-emitting diode in the liquid crystal display using the light-emitting diode as a light source.

A light-emitting diode 150 is provided on a metal substrate 161. The metal substrate 161 is formed in a case shape such that the heat generated at the light-emitting diode 150 received in the case is efficiently radiated. A resin material 175 is filled in the metal case to form a plate-shaped light source 130. It is possible to improve reliability during the handling in the manufacturing process by filling the resin material 175 to form the plate-shaped light source. It is possible to improve heat radiation effect by filling the resin material 157.

9 Claims, 15 Drawing Sheets

LIQUID CRYSTAL DISPLAY DEVICE WITH BACKLIGHT HAVING EFFICIENT HEAT RADIATING PROPERTIES

CLAIM OF PRIORITY

The present application claims priority from Japanese Application JP 2006-107315 filed on Apr. 10, 2006, the content of which is hereby incorporated by reference into this application.

BACKGROUND OF THE INVENTION

1. Field of the Invention

The present invention relates to a light source of a non-self light emission type display device, and more particularly to a liquid crystal display device having a backlight using a light-emitting device as a light source.

2. Description of the Related Art

Recently, a liquid crystal display device is widely used as a display device. In particular, the liquid crystal display device is of a thin type having a small thickness with light weight and low power consumption, and thus is used as a display unit of a mobile apparatus.

However, since the liquid crystal display is not of the self light emission type, light irradiation means is required. In general, as the light irradiation device used in the liquid crystal display device, a planar light irradiation device called a backlight is widely used. Conventionally, a cold cathode discharge tube is used in a light-emitting device (also referred to as a light source) of a backlight. However, recently, a light-emitting diode (hereinafter, referred to as LED) is also used as the light-emitting device of a mobile apparatus.

Japanese Laid-Open Patent Publication No. Sho. 64-88426 discloses a liquid crystal display device using a LED as a light source. Japanese Laid-Open Patent Publication No. 2002-162626A describes a technology relating to heat radiation of an LED.

SUMMARY OF THE INVENTION

However, when a plurality of LEDs is used as a backlight to increase brightness, an operation temperature increases and light emission efficiency deteriorates. Accordingly, a metal plate and the like are used in consideration of heat radiation. Since it is difficult to form a heat radiation member on the light emission surface of the LED, the structure is restricted in view of the heat radiation and light emission. In addition, since the handling in the manufacturing process is difficult, the reliability of the structure is reduced.

Accordingly, the present invention is contrived to solve the above-mentioned problems. An object of the invention is to provide a liquid crystal display device that includes a backlight and a light source with high reliability and that can be easily handled in the manufacturing process in view of the heat radiation of the backlight.

In order to accomplish the above-described object, according to an aspect of the invention, there is provided a liquid crystal display device including: a liquid crystal display panel in which a liquid crystal layer is provided between a pair of transparent substrates having electrodes for forming pixels therein; and a backlight which irradiates light to the rear surface of the liquid crystal display penal, wherein the backlight has a plurality of light-emitting elements, a circuit substrate on which the plurality of light-emitting elements are arranged, and a metal case for receiving the circuit substrate, and is integrally formed by filling a resin material on the circuit substrate in the metal case.

According to another aspect of the invention, there is provided a liquid crystal display device including: a liquid crystal display panel in which a liquid crystal layer is provided between a pair of transparent substrates having electrodes for forming pixels therein; and a planar light source which irradiates light to the rear surface of the liquid crystal display penal, wherein the planar light source has a plurality of light-emitting diodes arranged linearly, a circuit substrate for electrically connecting the plurality of light-emitting diodes, and a case having side surfaces and a bottom surface for receiving the circuit substrate, and is integrally formed by filling a resin material between the plurality of light-emitting diodes and the side surfaces in the case.

According to another aspect of the invention, there is provided a liquid crystal display device including: a liquid crystal display panel in which a liquid crystal layer is provided between a pair of transparent substrates having electrodes for forming pixels therein; a backlight which irradiates light to the rear surface of the liquid crystal display penal; and a control unit which controls the liquid crystal display panel, wherein the backlight has a light guiding plate and a plate-shaped light source formed along one side of the light guiding plate, the plate-shaped light source has a light-emitting surface, a bottom facing the light-emitting surface, and side surfaces formed on the circumference of the bottom; the bottom has a metal surface, an insulating layer covering the metal surface, and an interconnection provided on the insulating layer; the plurality of light-emitting diodes are electrically connected to the interconnection; an opening are formed in the side surfaces or the bottom; a connection wiring for electrically connecting the plurality of light-emitting diodes and the control unit is positioned in the opening; and a resin layer is formed on the insulating layer.

According to the present invention, in a liquid crystal display device using a light-emitting element as a light source, it is possible to realize a liquid crystal display device including a light source which is easily treated and has high reliability.

BRIEF DESCRIPTION OF THE DRAWINGS

FIG. 1 is a schematic block view showing the configuration of a liquid crystal display device according to an embodiment of the present invention.

FIG. 2 is a schematic diagram showing a light-emitting diode of the liquid crystal display device according to the embodiment of the present invention.

FIG. 3 is a schematic diagram showing a state that a light-emitting diode of the liquid crystal display device according to the embodiment of the present invention is mounted on a metal substrate.

FIG. 4 is a schematic diagram showing a plate-shaped light source of a liquid crystal display device according to an embodiment of the present invention.

FIG. 5 is a schematic diagram showing a plate-shaped light source of a liquid crystal display device according to an embodiment of the present invention.

FIG. 6 is a schematic diagram showing a plate-shaped light source of a liquid crystal display device according to an embodiment of the present invention.

FIG. 7 is a schematic diagram showing a plate-shaped light source of a liquid crystal display device according to an embodiment of the present invention.

FIG. 8 is a schematic cross-sectional view showing a state that the light-emitting diode of the liquid crystal display device according to the embodiment of the present invention is mounted on a metal substrate.

DESCRIPTION OF REFERENCE NUMERALS

1: liquid crystal display panel, 2: TFT substrate, 5: driving circuit, 6: driving circuit, 8: pixel unit, 9: display region, 10: switching element, 12: pixel electrode, 13: storage capacitor, 21: gate line (scanning signal line), 22: image signal line, 70: FPC, 71: interconnection, 75: terminal, 80: control circuit, 110: backlight, 120: light guiding plate, 121: optical sheet, 130: plate-shaped light source, 150: LED, 151: LED chip, 152: wire, 153: chip terminal, 154: chip mounting part, 155: cone-shaped reflection surface, 156: fluorescence light-emitting unit, 157: chip substrate, 158: p electrode, 159: n electrode, 160: mounting substrate, 161: metal substrate, 162: insulating layer, 163: interconnection, 164: surface insulating layer, 165: pad, 166: mark, 167: mark, 168: external terminal, 169: side surface, 171: external connection terminal, 172: connector, 173: external connection wiring, 174: reflection resin material, 175: resin material, 176: notch, 177: rear surface FPC, 178: light shielding member, 179: heat conduction member, 180: backlight, 181: upper receiving case, 182: lower receiving case, 183: window, 184: concave part, 185: convex part, 186: case notch, 187: plate-shaped light source holding part, 188: pressing member, 189: gap

DESCRIPTION OF THE PREFERRED EMBODIMENTS

Hereinafter, embodiments of the present invention will be described in detail with reference to the attached drawings.

First Embodiment

Figure 1:
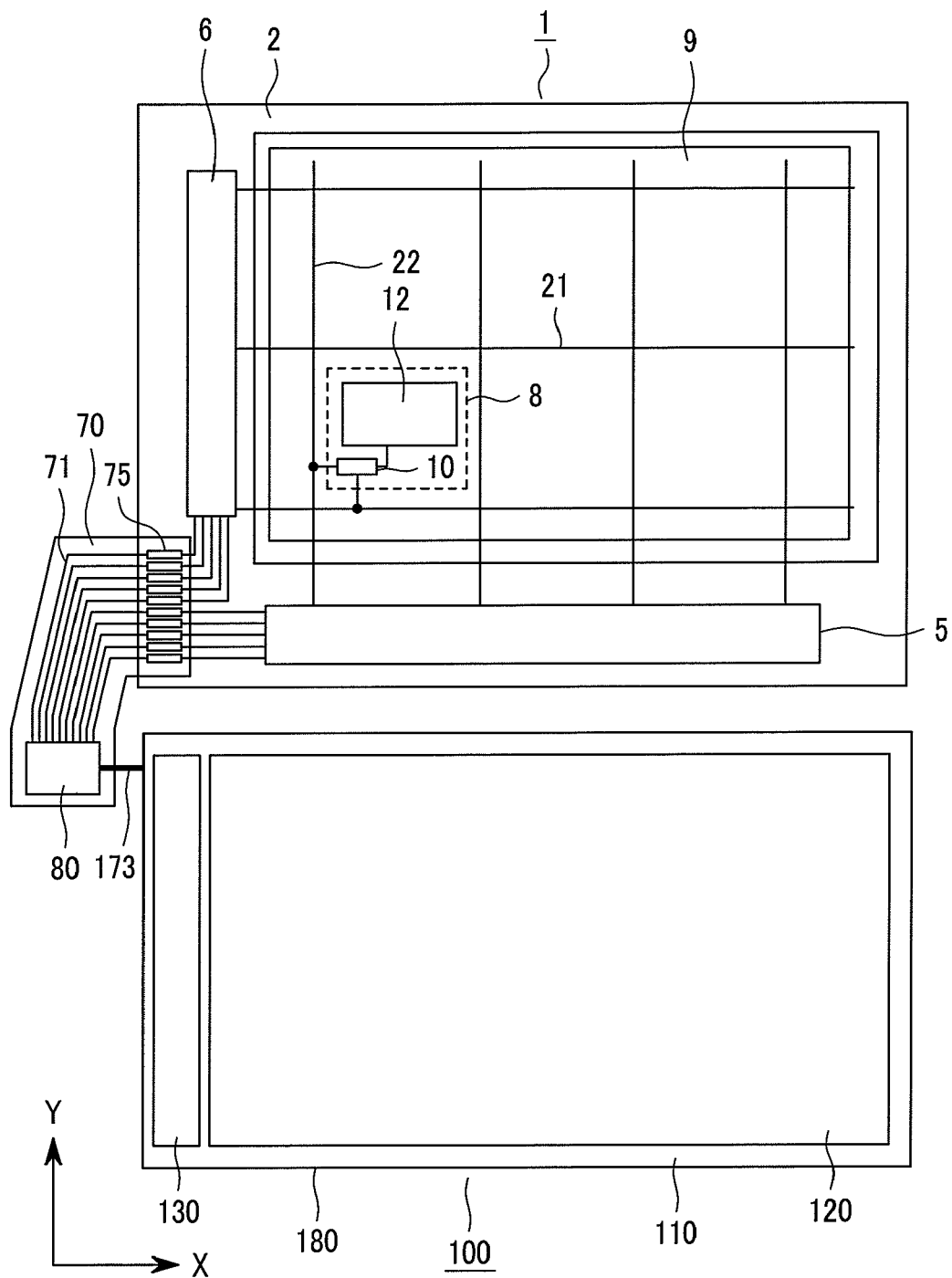

FIG. 1 is a plan view showing the whole configuration of a liquid crystal display device according to an embodiment of the present invention. In FIG. 1, the liquid crystal display device 100 includes a liquid crystal display panel 1, a backlight 110 and a control circuit 80. The liquid crystal display panel 1 is formed by sealing a liquid crystal layer between glass substrates having electrodes for forming pixels. A signal and power supply voltage, which are necessary for the display of the liquid crystal display panel 1, are supplied from the control circuit 80 to the liquid crystal display panel 1. The control circuit 80 is mounted on a flexible substrate 70, and a control signal is supplied to the liquid crystal display panel 1 through interconnections 71 and terminals 75.

The backlight 110 includes a light guide plate 120, a light source 130 and a receiving case 180. The backlight 110 is provided for the purpose of irradiating light to the liquid crystal display panel 1. In the liquid crystal display panel 1, the transmission amount or reflection amount of the light irradiated from the backlight 110 is controlled to perform the display. The backlight 110 overlaps the rear surface or the front surface of the liquid crystal display panel 1 with respect to a viewer. In FIG. 1, for facilitation of understanding, the backlight is shown parallel to the liquid crystal display panel 1. The detailed configuration of the backlight 110 will be described later.

Pixel electrodes 12 are provided in pixel units 8 of the liquid crystal display panel 1. A plurality of pixel units 8 are included in the liquid crystal display panel 1 in a matrix. However, to avoid the complexity of the drawing, only one pixel unit 8 is shown in FIG. 1. The pixel units 8 provided in the matrix form the display region 9, and each of the pixel units 8 functions as a pixel of a display image to display an image in the display region 9.

In FIG. 1, gate signal lines (also referred to as scanning signal lines) extending in an X direction are provided orthogonal to a Y direction, drain signal lines (also referred to as image signal lines) extending in the Y direction are provided orthogonal to the X direction, and each of the pixel units 8 is formed in a region surrounded by the gate signal lines 21 and the drain signal lines 22.

A switching element 10 is provided in the pixel unit 8. The gate signal line 21 supplies the control signal to turn on/off the switching elements 10. An image signal transmitted through the drain signal lines 22 is supplied to the pixel electrodes 12 by turning on the switching element 10.

The drain signal lines 22 are connected to a driving circuit 5 and the driving circuit 5 outputs the image signal. The gate signal lines 21 are connected to a driving circuit 6 and the driving circuit 6 outputs the control signal. The gate signal lines 21, the drain signal lines 22, the driving circuit 5 and the driving circuit 6 are formed on a TFT substrate 2.

Figure 2A:
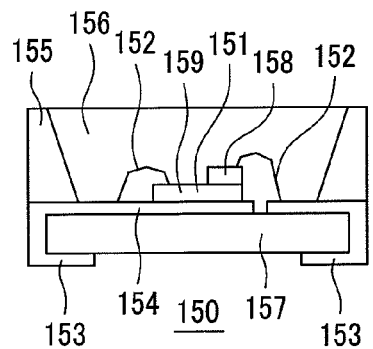
Figure 2B:
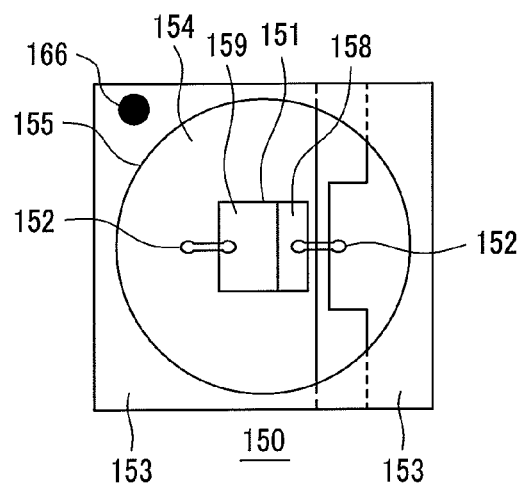
Figure 2C:
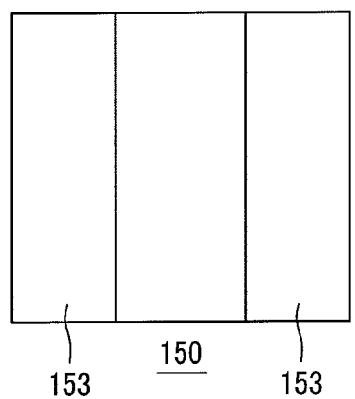

Next, FIG. 2 shows a schematic configuration of an LED 150 which is a light-emitting device, wherein FIG. 2A is a cross-sectional view thereof, FIG. 2B is a plan view thereof when viewed from a light-emitting surface side, and FIG. 2C is a plan view thereof when viewed from a rear surface side. The LED 150 has a structure in which a LED chip 151 serving as a light-emitting unit is mounted on a chip substrate 157. The LED chip 151 has a pn junction and emits light having a specific wavelength when a voltage is applied to the pn junction. A p electrode (anode) 158 is provided in a p-type semiconductor layer and an n electrode (cathode) 159 is provided in an n-type semiconductor layer.

Wires 152 are connected to the p electrode 158 and the n electrode 159, respectively. The wires 152 electrically connect the chip terminal 153 for connecting the LED 150 to an external terminal, and the P electrode 158 and n electrode 159, respectively.

At the light-emitting surface side of the LED chip 151, a fluorescence light-emitting unit 156 may be provided. The fluorescence light-emitting unit 156 has a function for converting the wavelength of the light emitted from the LED chip 151. In addition, a reference numeral 155 denotes a cone-shaped reflection surface which reflects light which travels in a horizontal direction to the emitting surface side. A reference numeral 166 denotes a mark for displaying the position of the cathode (or the anode).

The chip terminal 153 is connected to an external interconnection and the like on the rear surface of the chip substrate 157 and extends from the rear surface of the chip substrate 157 through the side surface thereof to the emitting surface side to form a chip mounting part 154. When the chip terminal 153 and the chip mounting part 154 are formed of metal having high light reflectivity, the chip mounting part 154 can be used as a light reflection surface. When the chip terminal 153 and the chip mounting part 154 are formed of metal having high heat conductivity (conductive member), the heat generated at the LED chip 151 can be radiated to the rear surface side of the chip substrate 157.

Figure 3A:
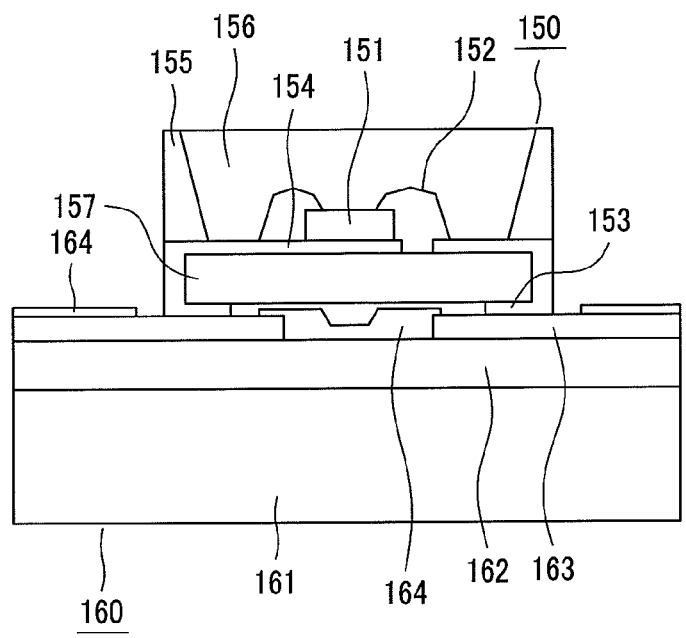
Figure 3B:
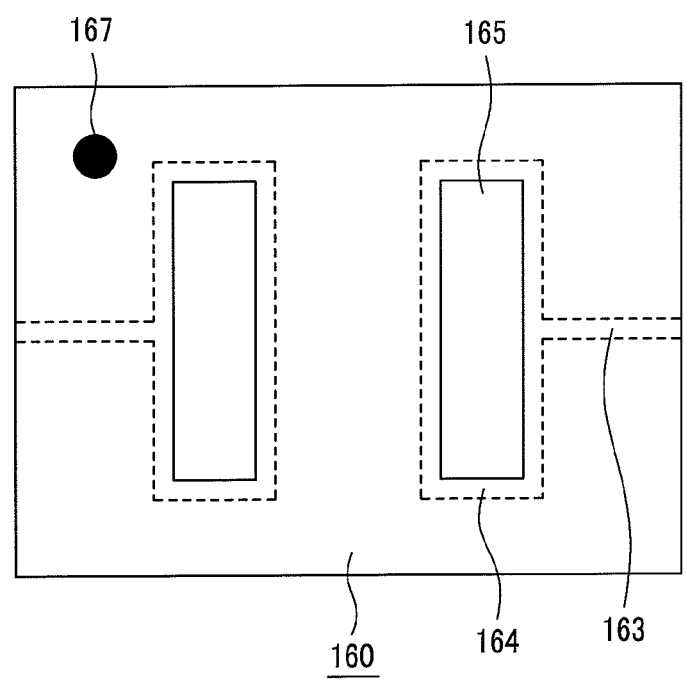

Next, a substrate on which the LED chip 151 is mounted will be described with reference to FIG. 3. FIG. 3A is a schematic cross-sectional view showing a state that the LED chip 151 is mounted on a metal substrate 161 and FIG. 3B is a schematic front view of a portion in which the LED chip 151 is mounted. In FIG. 3, a mounting substrate 160 is formed by coating the metal substrate 161 with an insulating layer 162, and an interconnection 163 formed of a conductive layer such as a copper foil is formed on the insulating layer 162. It is possible to efficiently radiate the heat transmitted to the rear surface side of the chip substrate 157 by forming the mounting substrate 160 using metal. In order to improve the heat radiation, it is preferable that the insulating layer 162 is thin such that a problem such as a short circuit or leakage does not occur. In the present invention, the thickness of the insulating layer 162 is about 0.12 mm and the heat conductivity thereof is about 6.5 W/m·K.

A pad 165 for connection is formed on the end of the interconnection and electrically connected to the chip terminal 153 of the LED chip 151. The surface of the mounting substrate 160 is coated with a surface insulating layer 164 and the interconnection is prevented from being short-circuited with other components on the surface of the mounting substrate 160 to maintain insulation with the pad 165. On the surface of the pad 165, the surface insulating layer 164 is removed in order to the electrical connection with the chip terminal 153. A soldering paste is printed on the portion of the pad 165 from which the surface insulating layer 164 is removed and the LED chip 151 is mounted on the mounting substrate 160 by a reflow process.

Since the soldering reflow process is used, a material having a low affinity with a solder is selected as the surface insulating layer 164. Since the surface insulating layer 164 is formed on the surface of the mounting substrate 160, the surface insulating layer 164 preferably has an achromatic color. In particular, in consideration of light use efficiency, the surface insulating layer 164 preferably has a white color or a color close to a white color for reflecting a large amount of light. For a material having high reflectivity, titanium oxide is suitable. A reference numeral 167 is a mark indicating the position of a cathode (or an anode). In order to improve visibility, a color different from the color used in the surface insulating layer 164 is used.

Figure 4A:
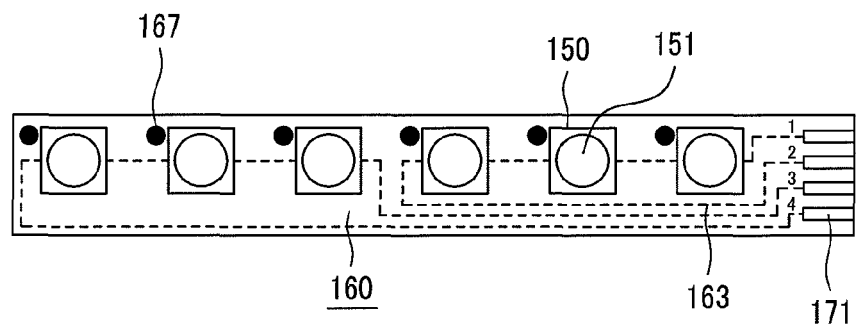
Figure 4B:
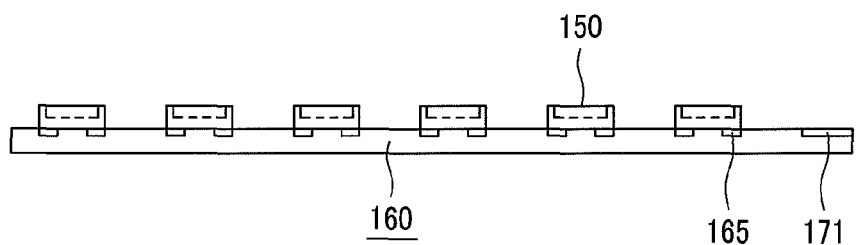
Figure 4C:
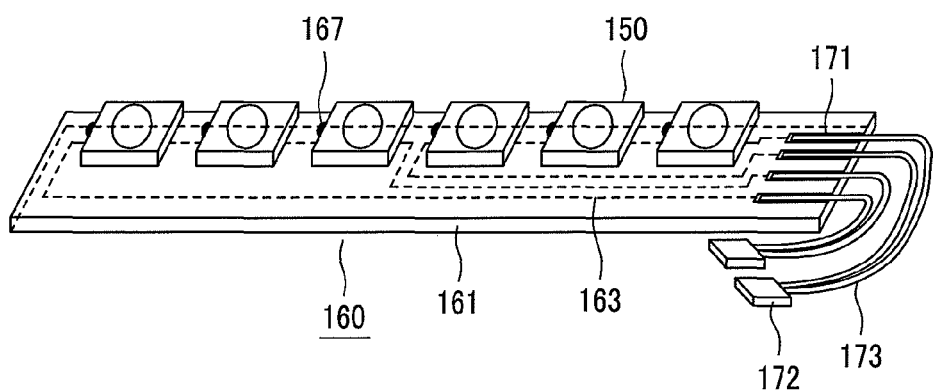

FIG. 4 is a schematic diagram showing a state that the LED 150 is linearly mounted on the mounting substrate 160, wherein FIG. 4A is a plan view thereof, FIG. 4B is a cross-sectional view thereof, and FIG. 4C is a perspective view showing a state that external connection wirings 173 are connected.

In FIG. 4, six LEDs 150 are arranged on the mounting substrate 160 so as to configure a linear light source. In the LED chip 151, a constant voltage difference occurs at the pn junction due to the diode characteristics. The voltage difference at the pn junction varies depending on the manufacturing process. Accordingly, an optimal voltage is controlled to be applied to the pn junction. However, when an n number of LED chips 151 are connected in parallel, an n number of control circuits are required and thus manufacturing cost for the control increases.

In FIG. 4, the LEDs 150 are connected in series three by three and a voltage is controlled in three LEDs. When a power supply voltage is 12V, which is used in a vehicle, and a potential difference which occurs in the LED chip 151 is about 4V, it is efficient that three LEDs are connected in series. That is, the connection is efficient when the relationship of $V > n \times Vd$ is established, where a power supply voltage is V, the potential difference is Vd which occurs in the LED chip 151, and the number is n.

When a potential difference which occurs in each LED chip 151 is about 3V and a power supply voltage is 12V, it is efficient that four LEDs are connected in series. When a resistor is inserted between a final LED chip 151 of n LED chips 151 connected in series and ground to perform the control, two interconnections are required in the serial connection. In the present embodiment, four interconnections are used and an external connection terminal 171 is formed on each interconnection. As shown in FIG. 4C, the external connection terminals 171 are connected with the external connection wirings 173. Connectors 172 are provided on the ends of the external connection wirings 173 and connected to the control circuit 80 shown in FIG. 1.

Figure 5A:
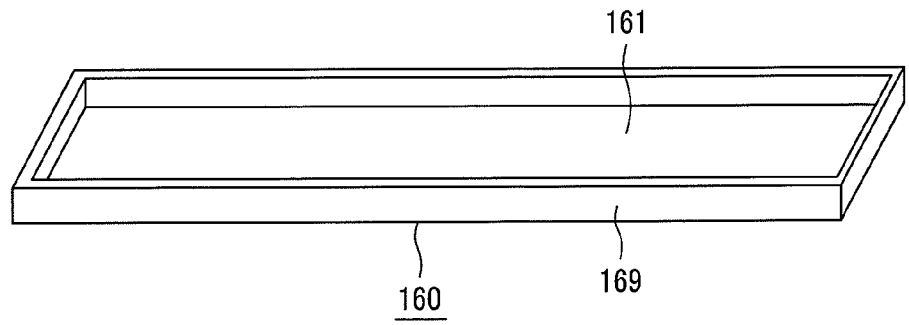

FIG. 5 is a perspective view showing the structure of the metal substrate 161 having a box shape, wherein FIG. 5A shows the structure in which frame-shaped side surfaces 169 are formed at the circumferences of the metal substrate 161. The side surfaces 169 are formed to surround the metal substrate 161 and form a container having an emitting port for emitting light from the LEDs 150 upward.

Figure 5B:
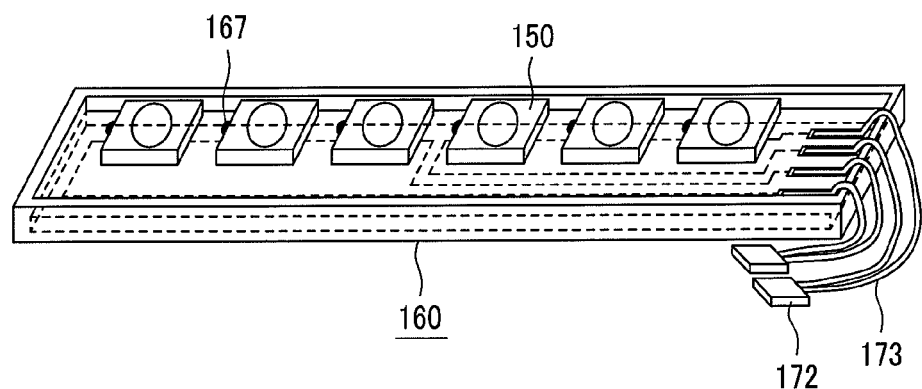

In FIG. 5B, the insulating layer 162, the interconnection 163 and the surface insulating layer 164 shown in FIGS. 3 and 4C are formed and the mounting substrate 160 in which the LEDs 150 are mounted is received in the container of the metal substrate 161 having the box shape. The external connections 173 are led out of the mounting substrate 160 through the upper end of the side surface 169.

Figure 5C:
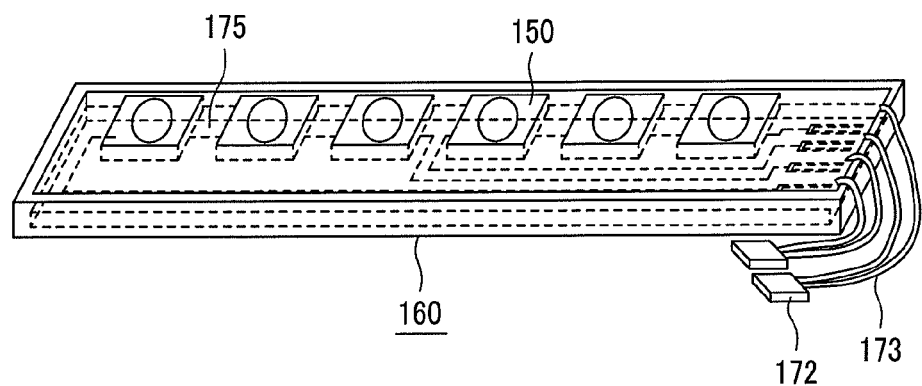

FIG. 5C shows the structure in which a resin material 175 is filled in the container formed by the metal substrate 161. The resin material 175 is filled to bury portions other than the upper surfaces of the LEDs 150. As shown in FIG. 5C, when the metal substrate 161 has the box shape and the resin material 175 is filled in the container, the mounting substrate 160 can be treated as one plate-shaped light source. Hereinafter, the structure in which the resin material 175 is filled (coated) in the mounting substrate 160 is also called a plate-shaped light source unit 130.

When the resin material 175 having heat conductivity higher than that of air is used, heat radiation effect is improved. While the heat conductivity of air is about 0.0261 W/m·K, the heat conductivity of epoxy resin is about 0.3 W/m·K, the heat conductivity of acrylic resin is about 0.21 W/m·K, and the heat conductivity of polycarbonate resin is about 0.23 W/m·K as the reference of the heat conductivity of resin, which is improved by about one digit compared with air.

The external connection wirings 173 are fixed with the resin material 175 to be easily treated and are externally led out through the upper end of the side surface 169. Accordingly, a problem occurs in that the thickness of the plate-shaped light source 130 increases by the thickness of the external connection wiring 173. A problem also occurs in that a gap between the light-emitting surface of the plate-shaped light source 130 and the light guide plate 120 is generated by the external connection wirings 173.

Figure 6A:
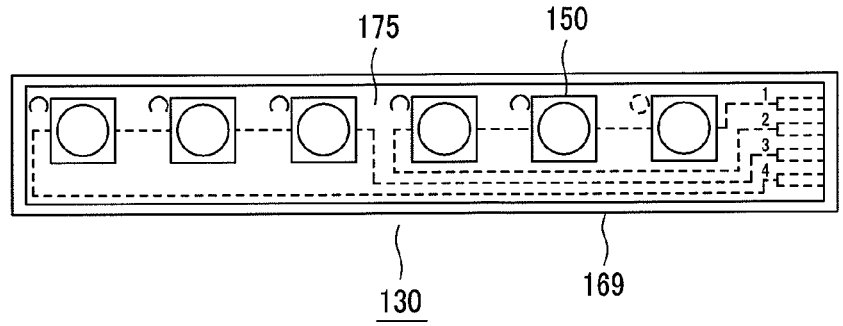
Figure 6B:
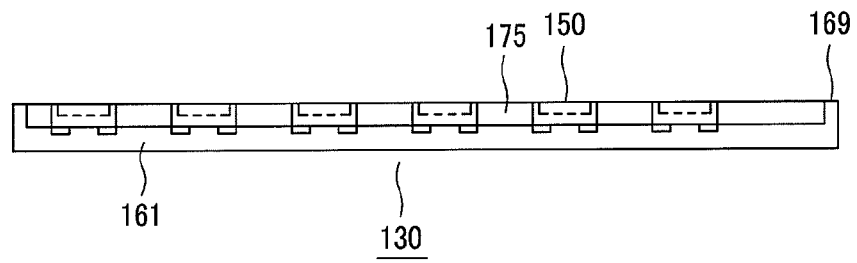

Next, the structure in which the resin material 175 is filled in the plate-shaped light source 130 will be described with reference to FIG. 6. FIG. 6A is a plan view when viewed from the upper side of the plate-shaped light source 130. The resin material 175 is filled in the container surrounded by the side surfaces 169. The resin material 175 covers other portions than the upper surfaces of the LEDs 150. FIG. 6B is a cross-sectional view showing the plate-shaped light source 130. The resin material 175 is filled between the LEDs 150 to expose the upper surfaces of the LEDs 150 and has a thickness substantially equal to the thickness of the LEDs 150.

When the height of the upper ends of the side surfaces 169 is equal to that of the upper surfaces of the LEDs 150, the light-emitting surface including the plane of the resin material 175 is planarized. The upper end of the side surface 169 may contact the light guiding plate 120 by increasing the height of the side surface 169 to some extent such that an air layer is formed between the light guiding plate 120 and the upper surfaces of the LEDs 150.

Figure 6C:
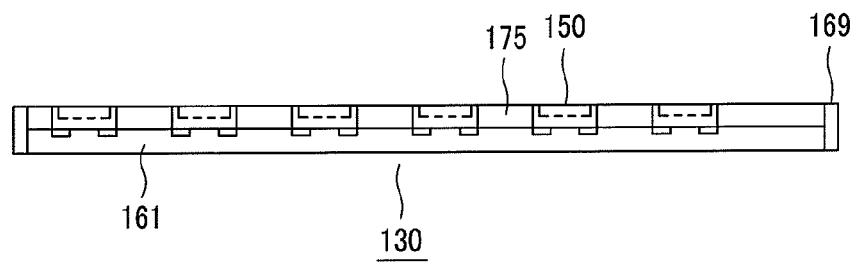
Figure 6D:
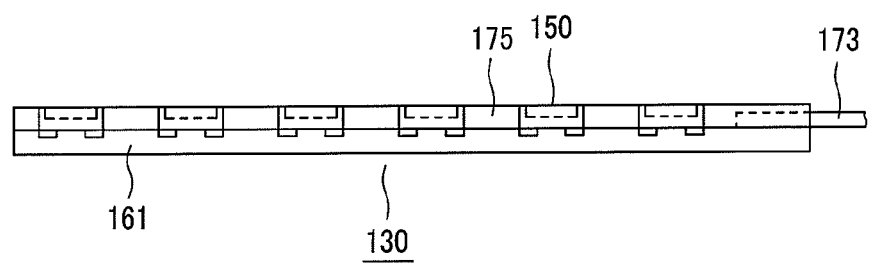

In FIG. 6C, the frame-shaped side surfaces 169 surround the circumference of the metal substrate 161. A process of forming the metal substrate 161 in a planar state into the box shape may be omitted. In FIG. 6D, the frame-shaped side surfaces are removed after filling the resin material 175. Accordingly, the process is simplified and the external connection wirings 173 are easily led out. When light leaks from the side surfaces, a process of coating the side surface may be performed such that a light shielding portion is formed at the side surface.

Figure 7A:
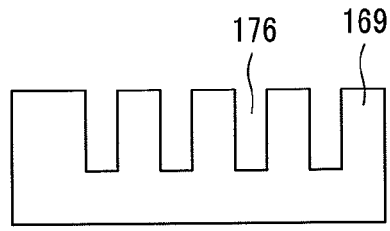

FIG. 7 is a view showing a structure formed such that the external connection wirings 173 are led out. As shown in the plan view of FIG. 7A, notches 176 are formed in the longitudinal end surface of the side surface 169 such that the external connection wirings 173 are inserted into the notches 176 to be led out to the external of the plate-shaped light source 130.

Figure 7B:
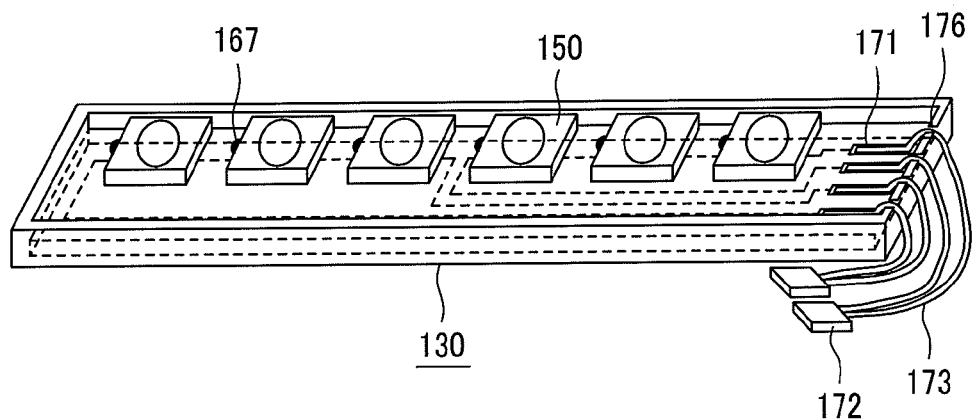

As shown in the perspective view of FIG. 7B, the notches 176 are provided on extension lines of the external terminals 171 and have a width nearly equal to the diameter of the external connection wirings 173. Since the notches 176 have the width nearly equal to the diameter of the external connection wirings 173, it is possible to prevent the resin material 175 from flowing out through the gaps of the notches 176.

Figure 7C:
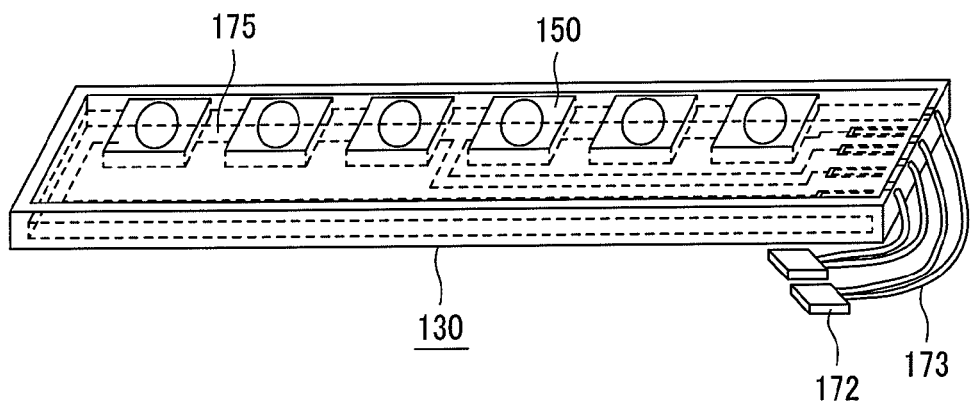

As shown in the perspective view of FIG. 7C, when the external connection wirings 173 are led out through the notches 176 of the side surface 169, the increase of the thickness of the plate-shaped light source 130 is suppressed while the external connection wirings 173 do not overlap the upper end of the side surface 169. When light leaks from the notches 176, a light shielding member may be formed on the resin material 175 close to the notches 176 or coloring to the resin material 175 may be performed.

Figure 8A:
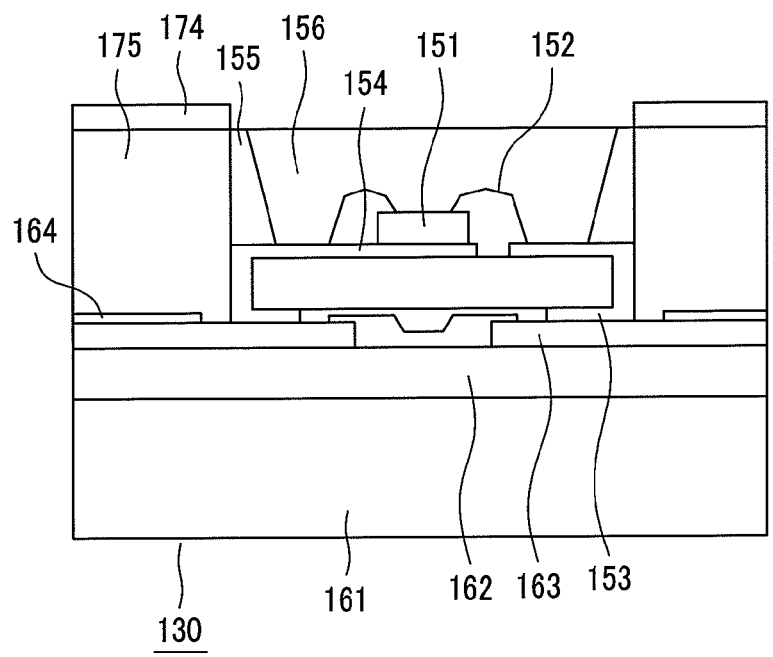

FIG. 8A is a cross-sectional view showing main parts in order to explain the structure in which a reflection layer 174 is formed on the upper surface of the resin material 175. When the plate-shaped light source 130 is provided in the vicinity of the light guiding plate 120, the light reflected from the light guiding plate 120 is reflected from the reflection layer 174 and emitted toward the light guiding plate 120. The reflection layer 174 preferably has an achromatic color, but may be colored if brightness is corrected with respect to a specific color. It is possible to improve heat radiation effect by forming the reflection layer 174 using a material having a high reflectivity and high heat conductivity, such as titanium oxide.

Figure 8B:
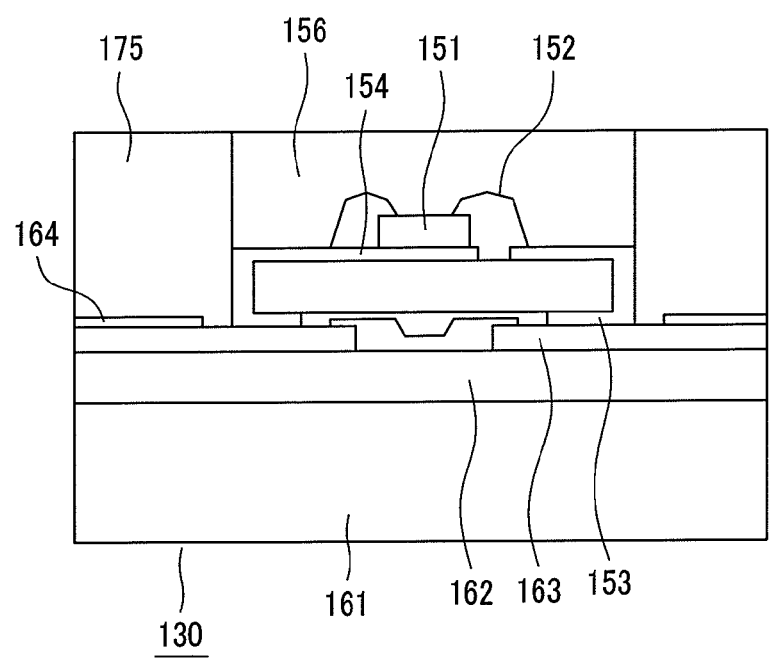

FIG. 8B is a cross-sectional view showing main part in order to explain the structure in which the cone-shaped reflection surface 155 is removed and a member for scattering light is mixed in the resin material 175. Among the light emitted from the fluorescence light-emitting unit 156, the light incident to the resin material 175 is scattered and a portion thereof is emitted to the light guiding plate 120. As described above, the surface insulating layer 164 having high reflectivity is provided on the upper surface of the metal substrate 161 and the light reflected from the surface insulating layer 164 is emitted to the light guiding plate 120. The surface insulating layer 164 preferably has an achromatic color, but may be colored if brightness is corrected with respect to a specific color.

Figure 9:
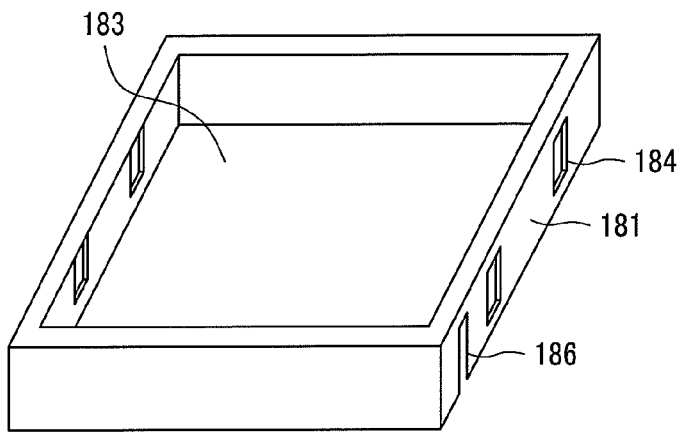
FIG. 9 is a schematic development view showing a backlight of a liquid crystal display device according to an embodiment of the present invention.
Figure 9:
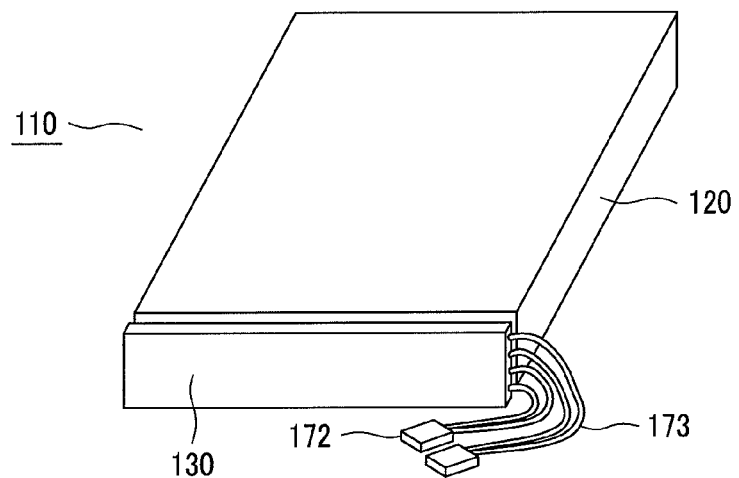
Figure 9:
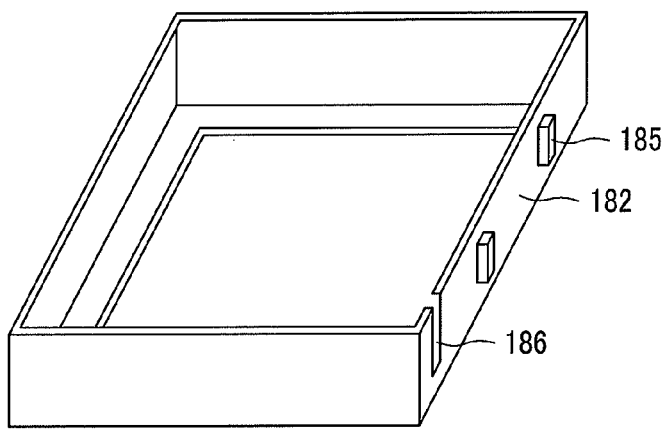

FIG. 9 is a development view showing the structure of the backlight 110 for receiving the plate-shaped light source 130 and the light guiding plate 120. The plate-shaped light source 130 and the light guiding plate 120 are inserted and maintained by an upper receiving case 181 and a lower receiving case 182. Concave parts 184 are provided in the side surfaces of the upper receiving case 181 and convex parts 185 are provided on the side surfaces of the lower receiving case 182 such that the convex parts 185 are fitted into the concave parts 184. Accordingly, the upper receiving case 181 and the lower receiving case 182 are fixed such that the plate-shaped light source 130 and the light guiding plate 120 are maintained therein.

A window 183 is formed in the upper receiving case 181 such that the light emitted from the light guiding plate 120 is irradiated to the liquid crystal display panel. Notches 186 for passing the external connection wirings 173 are formed in the upper receiving case 181 and the lower receiving case 182.

Figure 10:
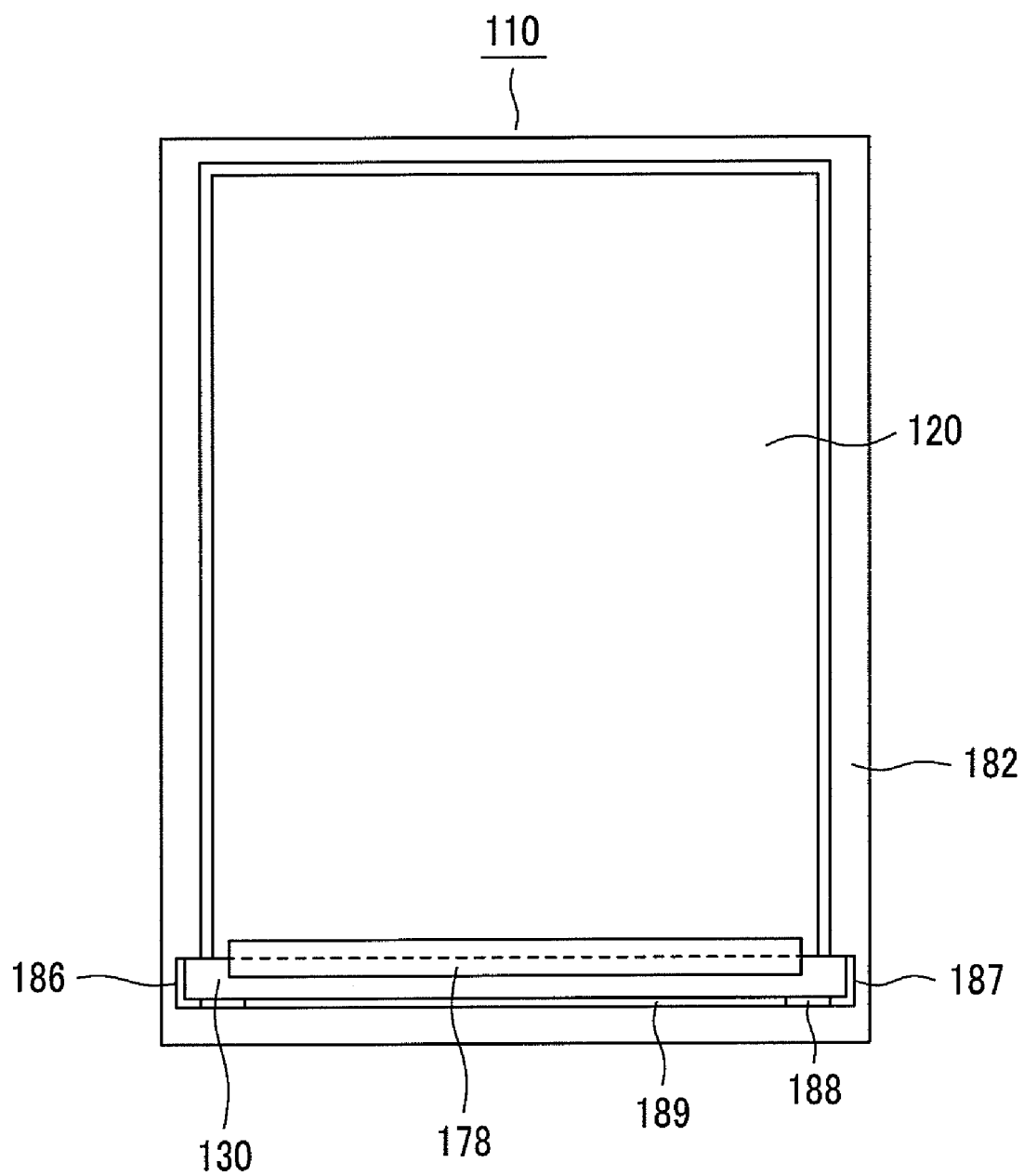
FIG. 10 is a schematic view showing a backlight of a liquid crystal display device according to an embodiment of the present invention.

FIG. 10 is a view illustrating a positional relationship between the plate-shaped light source 130 and the light guiding plate 120 received in the lower receiving case 182 and FIG. 10 is a schematic plan view showing the plate-shaped light source 130 and the light guiding plate 120 received in the lower receiving case 182. A pressing member 188 is provided between the side surface of the lower receiving case 182 and the plate-shaped light source 130, and the plate-shaped light source 130 is held such that the light emitting surface contacts the side surface of the light guiding plate 120, in order to prevent light from leaking from the gap between the plate-shaped light source 130 and the light guiding plate 120. A reference numeral 178 indicates, for example, a light shielding member formed of a colored tape. The light shielding member 178 is attached to prevent light from leaking between the plate-shaped light source 130 and the light guiding plate 120.

As shown in FIG. 10, the pressing member 188 is provided between the plate-shaped light source 130 and the lower receiving case 182, and the plate-shaped light source 130 is held such that the light emitting surface contacts the side surface of the light guiding plate 120. However, a gap 189 is generated between the sidewall of the lower receiving case 182 and the plate-shaped light source 130 by the pressing member 188. Air can be convected by the gap 189 and thus the heat radiation effect of the plate-shaped light source 130 is improved.

Figure 11:
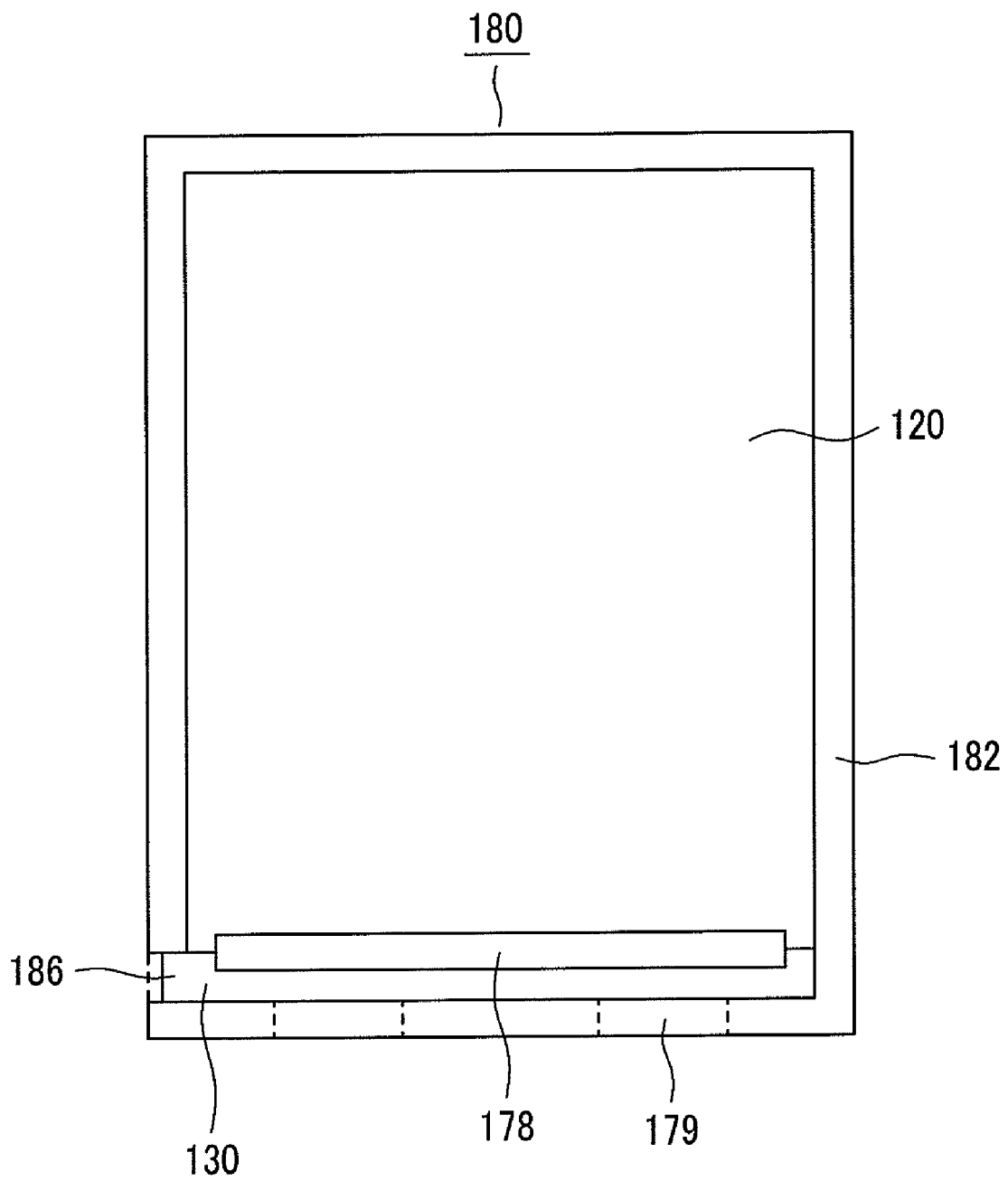
FIG. 11 is a schematic view showing a backlight of a liquid crystal display device according to an embodiment of the present invention.

FIG. 11 is a plan view showing the structure in which the inner surface of the lower receiving case 182, the rear surface of the plate-shaped light source 130 and the side surface of the light guiding plate 120 contact with each other to be held. The inner side surfaces of the lower receiving case 182 defines the positions of the plate-shaped light source 130 and the light guiding plate 120. However, in the structure shown in FIG. 11, the heat radiation effect of the plate-shaped light source 130 deteriorates when the heat conductivity of the lower receiving case 182 is low. Accordingly, a heat conduction member 179 having high heat conductivity is provided on the sidewall of the lower receiving case 182 which contacts the rear surface of the plate-shaped light source 130.

Figure 12:
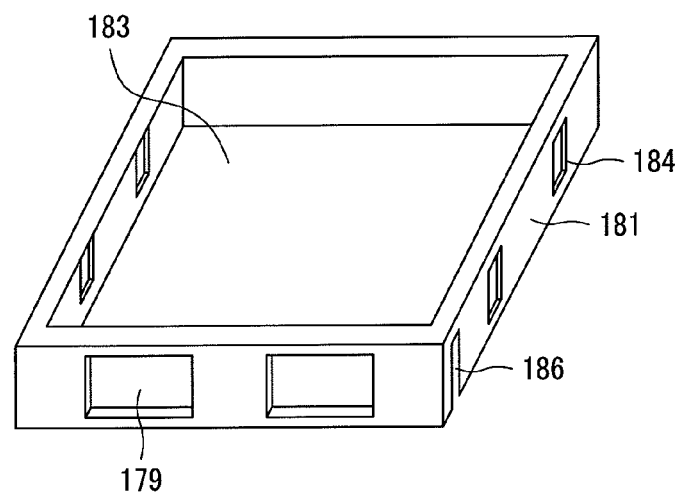
FIG. 12 is a schematic view showing a backlight of a liquid crystal display device according to an embodiment of the present invention.
Figure 12:
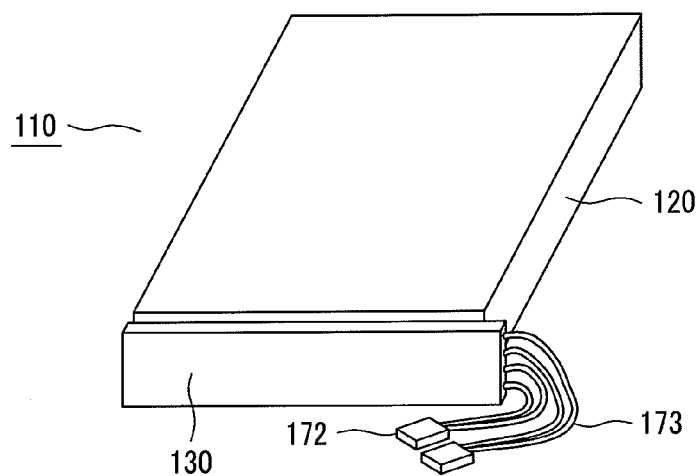
Figure 12:
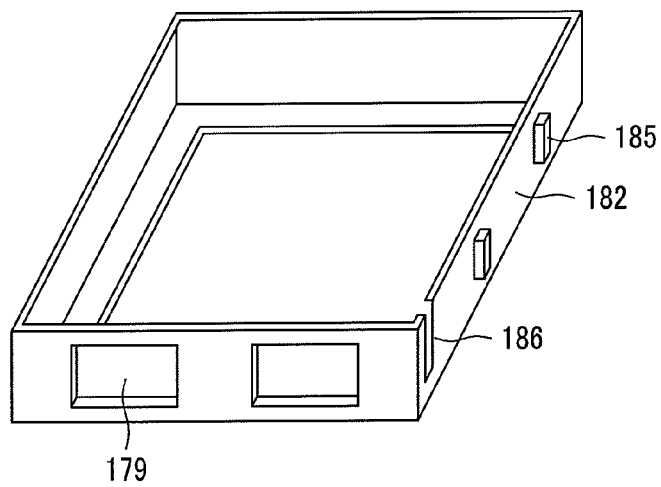

FIG. 12 is a development view of the backlight 110 in order to explain the structure in which the plate-shaped light source 130 and the light guiding plate 120 contact the inner surface of the lower receiving case 182. The heat conduction member 179 is also formed in the upper receiving case 181 similar to the lower receiving case 182. In FIG. 12, a window is formed at the position of the heat conduction member 179 to improve the heat radiation effect by air convention. Even when the heat conduction member 179 is provided at the position of the window, it is possible to improve the heat radiation effect.

Figure 13:
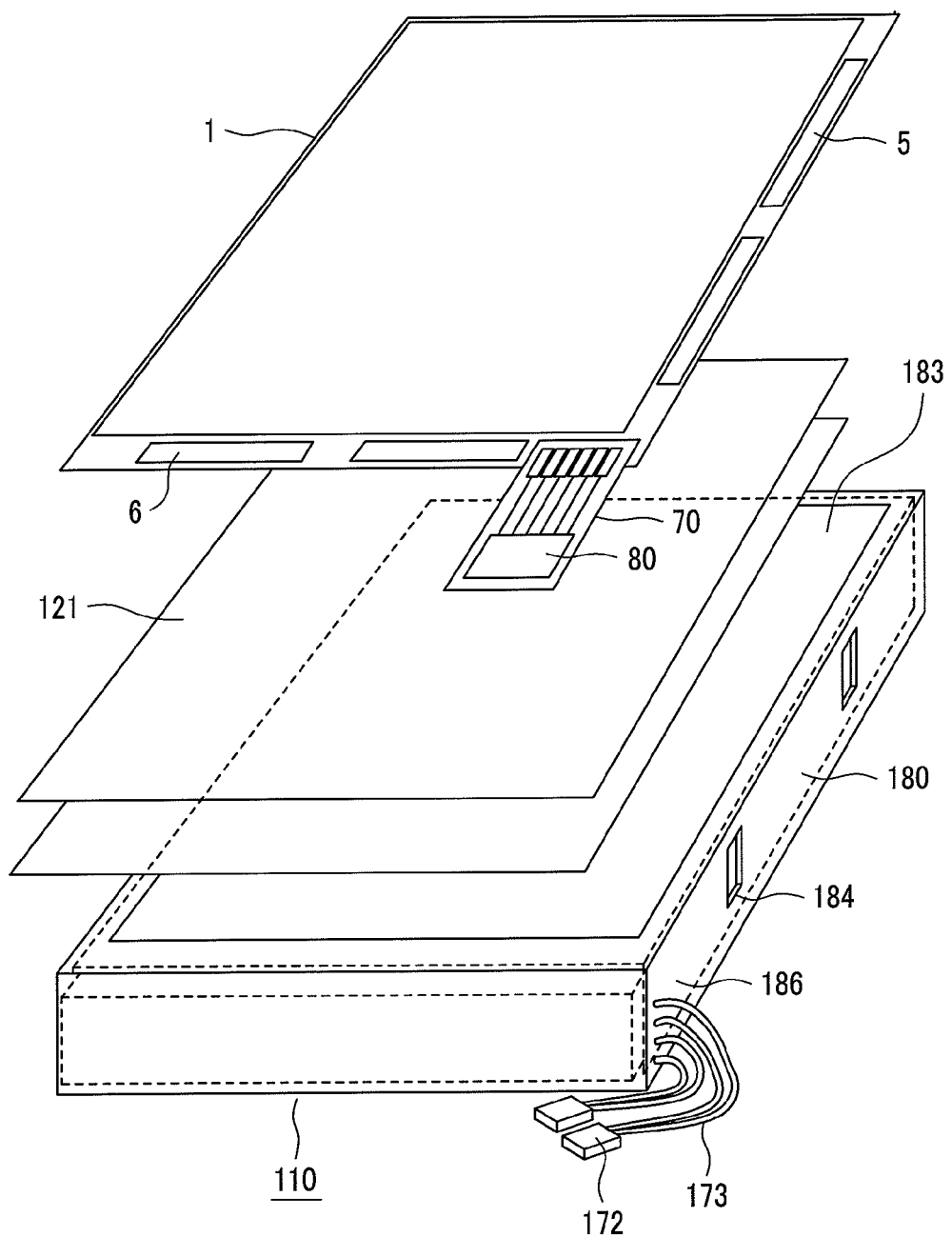
FIG. 13 is a schematic development view showing a state that a liquid crystal panel is mounted in a backlight of a liquid crystal display device according to an embodiment of the present invention.

FIG. 13 is a development view of a liquid crystal display device according to the present invention, in which the liquid crystal display panel 1 is mounted on the backlight 110. The liquid crystal display panel 1 is mounted at the side of the window 183 for emitting the light of the backlight 110. An optical sheet 121 is provided, if necessary, between the liquid crystal display panel 1 and the backlight 110. The control circuit 80 is connected to the liquid crystal display panel 1 through the flexible substrate 70.

Figure 14A:
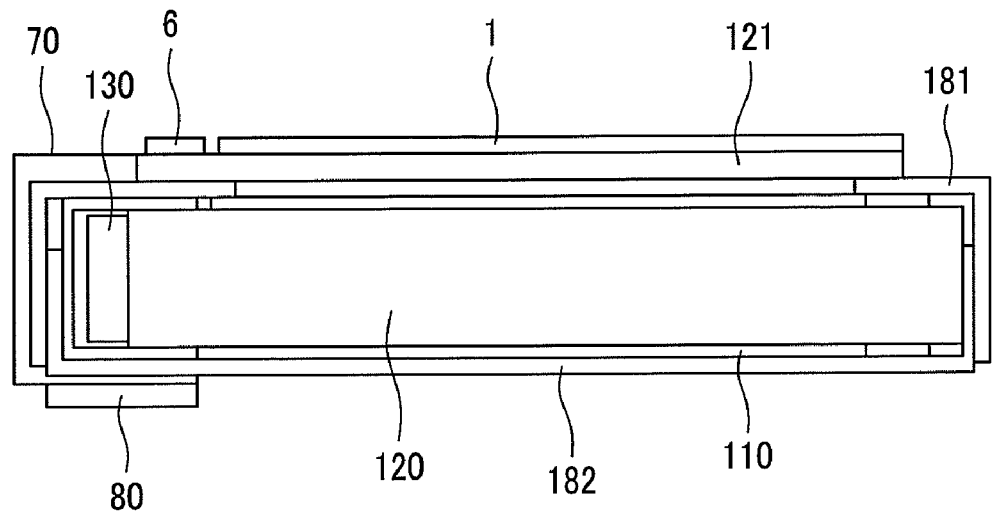
FIG. 14 is a schematic view showing a state that a liquid crystal panel is mounted in a backlight of a liquid crystal display device according to an embodiment of the present invention.
Figure 14B:
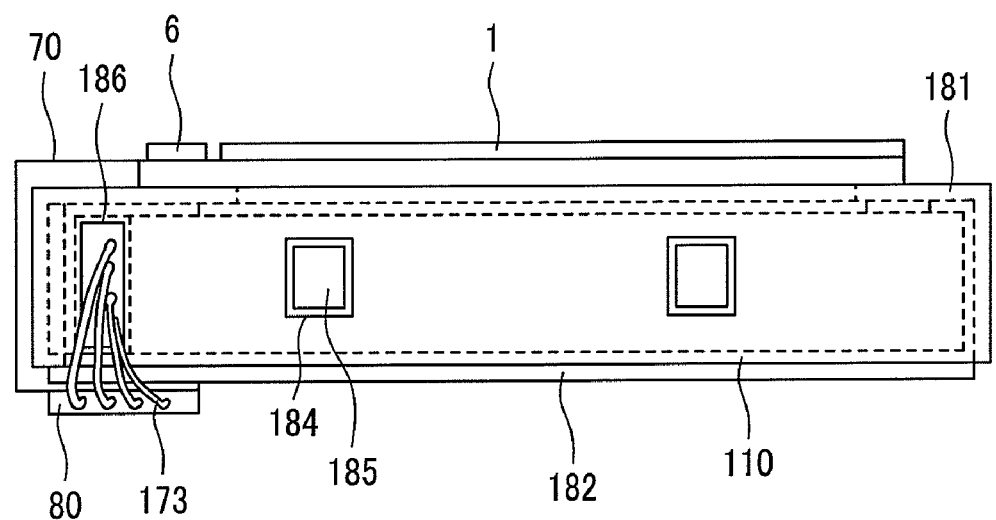

FIG. 14 is a schematic view showing the structure in which the liquid crystal display panel 1 is mounted on the backlight 110, wherein FIG. 14A is a cross-sectional view thereof and FIG. 14B is a side view thereof. As shown in FIG. 14A, the light-emitting surface of the plate-shaped light source 130 and the light entrance surface of the light guiding plate 120 closely adhere to each other. The flexible substrate 70 is bent to extend to the rear surface of the backlight 110 and the control circuit 80 is provided on the rear surface of the backlight 110.

As shown in FIG. 14B, the notch 186 is provided in the side surface of the backlight 110 and the external connection wirings 173 are led out through the notch 186 to be connected to the control circuit 80. The notch 186 is positioned to be close to the control circuit 80.

Figure 15A:
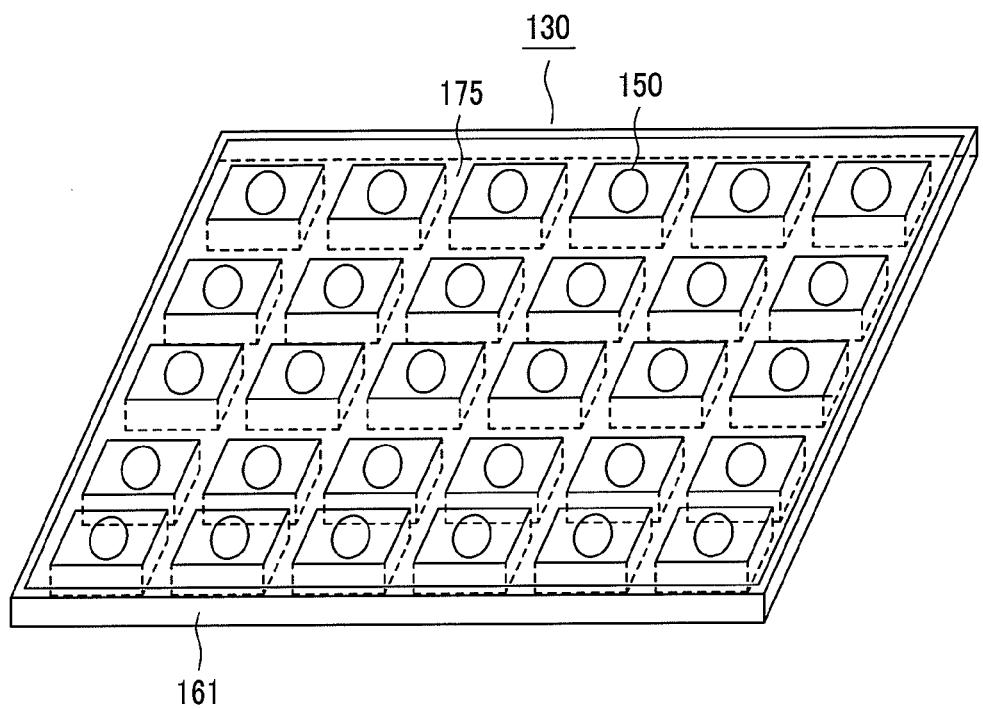
FIG. 15 is a schematic development view showing a planar light source of a liquid crystal display device according to an embodiment of the present invention.
Figure 15B:
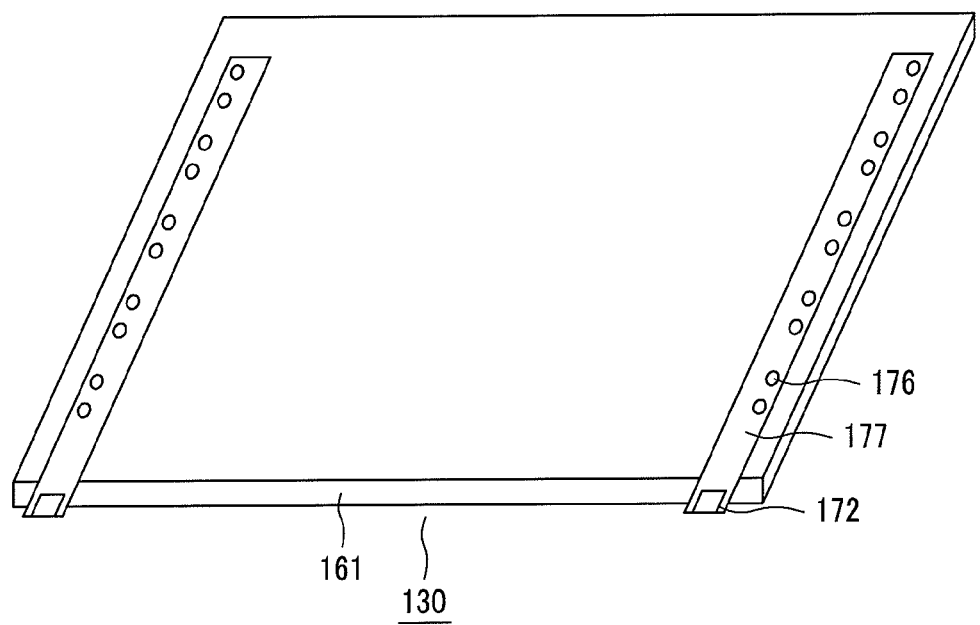

FIG. 15 is a development view of a planar light source in which the plate-shaped light source 130 is formed into a planar shape. As shown in FIG. 15A, the plurality of LEDs 150 are arranged in a matrix to configure the planar light source. As shown in FIG. 15B, a flexible substrate 177 is provided on the rear surface to supply a voltage to the LEDs 150. The flexible substrate 177 and the LEDs 150 are connected through notches (openings) 176 provided in the rear surface of the metal substrate 161. A connector 172 is provided on the end of the flexible substrate 177 to be connected to the control circuit 80 and the like.

What is claimed is:

1. A liquid crystal display device comprising:
a liquid crystal display panel in which a liquid crystal layer is provided between a pair of transparent substrates having electrodes for forming pixels therein; and
a backlight which irradiates a rear surface of the liquid crystal display panel;
wherein the backlight has a light source which includes: a plurality of light-emitting elements, a circuit substrate on which the plurality of light-emitting elements are arranged, and a metal case arranged for receiving the circuit substrate;
wherein a resin material is filled in the metal case on the circuit substrate and around sides of the plurality of light-emitting elements in the metal case; and
wherein each of the plurality of light-emitting elements include a LED chip and a fluorescence light-emitting unit provided at a light-emitting surface side of the LED chip.

2. The liquid crystal display device according to claim 1, wherein the plurality of light-emitting elements is a plurality of light-emitting diodes.

3. The liquid crystal display device according to claim 2, wherein the plurality of light-emitting diodes is divided into at least two groups of light-emitting diodes and a voltage is applied to each group of light-emitting diodes.

4. The liquid crystal display device according to claim 1, wherein the metal case includes a bottom surface and two pairs of side surfaces which extend in directions transverse to one another.

5. A liquid crystal display device comprising:
a liquid crystal display panel in which a liquid crystal layer is provided between a pair of transparent substrates having electrodes for forming pixels therein; and
a backlight which irradiates a rear surface of the liquid crystal display panel;
wherein the backlight has a light source which includes: a plurality of light-emitting diodes arranged linearly, a circuit substrate for electrically connecting the plurality of light-emitting diodes, and a case having side surfaces and a bottom surface for receiving the circuit substrate;
wherein a resin material is filled in the case on the circuit substrate between the plurality of light-emitting diodes and the side surfaces of the case;
wherein a fluorescence light-emitting unit is provided at a light-emitting surface side of each of the plurality of light-emitting diodes; and
wherein the case is a metal case which includes a bottom surface and two pairs of side surfaces which extend in directions transverse to one another.

6. The liquid crystal display device according to claim 5, wherein the plurality of light-emitting diodes is divided into at least two groups of light-emitting diodes and a voltage is applied to each group of light-emitting diodes.

7. A liquid crystal display device comprising:
a liquid crystal display panel in which a liquid crystal layer is provided between a pair of transparent substrates having electrodes for forming pixels therein;
a backlight which irradiates a rear surface of the liquid crystal display panel; and
a control unit which controls the liquid crystal display panel,
wherein the backlight has a light guiding plate and a plate-shaped light source formed along one side of the light guiding plate;
wherein the plate-shaped light source has a light-emitting surface, a bottom facing the light-emitting surface, and side surfaces formed on the circumference of the bottom;
wherein the bottom has a metal surface, an insulating layer covering the metal surface, and an interconnection provided on the insulating layer;
wherein a plurality of light-emitting diodes are electrically connected to the interconnection;
wherein an opening is formed in the side surfaces or the bottom;
wherein a connection wiring for electrically connecting the plurality of light-emitting diodes and the control unit is positioned in the opening; and wherein a resin layer is formed on the insulating layer.

8. The liquid crystal display device according to claim 7, wherein the plurality of light-emitting diodes is divided into at least two groups of light-emitting diodes and a voltage is applied to each group of light-emitting diodes.

9. The liquid crystal display device according to claim 7, wherein the resin layer is arranged over the bottom of the plate-shaped light source.

* * * * *